(12) United States Patent
Duncan

(10) Patent No.: US 7,373,900 B2
(45) Date of Patent: May 20, 2008

(54) PET BED COVERING WITH INTEGRATED PILLOW

(76) Inventor: Vern Duncan, 1724 Capitola, Santa Maria, CA (US) 93458

( * ) Notice: Subject to any disclaimer, the term of this patent is extended or adjusted under 35 U.S.C. 154(b) by 12 days.

(21) Appl. No.: 11/411,304

(22) Filed: Apr. 27, 2006

(65) Prior Publication Data

US 2007/0289537 A1 Dec. 20, 2007

(51) Int. Cl.
*A01K 1/035* (2006.01)

(52) U.S. Cl. ................................... 119/28.5

(58) Field of Classification Search .............. 119/28.5, 119/482, 484, 496, 497, 498; 5/420, 455
See application file for complete search history.

(56) References Cited

U.S. PATENT DOCUMENTS

| | | | | |
|---|---|---|---|---|
| 2,032,248 A * | 2/1936 | Bins | ................ | 119/482 |
| 2,775,222 A * | 12/1956 | Kruck | ................ | 119/482 |
| 3,902,456 A * | 9/1975 | David | ................ | 119/28.5 |
| 4,999,863 A * | 3/1991 | Kane | ................ | 5/98.1 |
| 5,000,116 A * | 3/1991 | Fife et al. | ................ | 119/28.5 |
| 5,010,843 A * | 4/1991 | Henry | ................ | 119/28.5 |
| 5,033,408 A * | 7/1991 | Langenbahn | ................ | 119/28.5 |
| 5,136,981 A * | 8/1992 | Barreto et al. | ................ | 119/28.5 |
| 5,144,911 A * | 9/1992 | Moore et al. | ................ | 119/28.5 |
| 5,197,411 A * | 3/1993 | Schwarzenbart | ................ | 119/28.5 |
| 5,265,558 A * | 11/1993 | Schonrock | ................ | 119/28.5 |
| 5,357,901 A * | 10/1994 | Batts | ................ | 119/28.5 |
| 5,551,373 A * | 9/1996 | O'Donnell | ................ | 119/28.5 |
| 5,588,393 A * | 12/1996 | Heilborn | ................ | 119/28.5 |
| 5,718,191 A * | 2/1998 | O'Donnell | ................ | 119/771 |
| 5,724,911 A * | 3/1998 | McAlister | ................ | 119/28.5 |
| 5,765,502 A * | 6/1998 | Haugh | ................ | 119/28.5 |
| 5,784,995 A * | 7/1998 | Willinger | ................ | 119/28.5 |
| 5,826,537 A * | 10/1998 | Heilborn | ................ | 119/28.5 |
| 6,196,157 B1 * | 3/2001 | Northrop et al. | ................ | 119/28.5 |
| 6,574,810 B2 * | 6/2003 | Mangiaracina | ................ | 5/655 |
| D534,692 S * | 1/2007 | Northrop | ................ | D30/118 |
| D534,693 S * | 1/2007 | Northrop | ................ | D30/118 |
| D535,062 S * | 1/2007 | McGinley | ................ | D30/118 |
| 7,225,756 B2 * | 6/2007 | Greenfield | ................ | 119/28.5 |

* cited by examiner

*Primary Examiner*—Yvonne R. Abbott
(74) *Attorney, Agent, or Firm*—Jeffrey Weiss; Harry M. Weiss; Weiss & Moy, P.C.

(57) ABSTRACT

A pet bed covering apparatus has a pillow region and a side region. The pillow region is adapted to at least substantially cover the bottom portion of a pet bed, and the side region is adapted to at least substantially cover the interior sides of the pet bed. A removable pillow is positioned within the pillow region.

1 Claim, 2 Drawing Sheets

PET BED COVERING WITH INTEGRATED PILLOW

FIELD OF THE INVENTION

The present invention relates generally to pet bed coverings and, more particularly, to a pet bed covering with an integrated pillow.

BACKGROUND OF THE INVENTION

Pet beds of various kinds are known in the art. Often, they are configured as a cushion or pillow located within a wicker-style basket. However, prior art pet beds can be difficult to clean. Most dogs shed, and hairs that have lodged in the wicker can be difficult to effectively remove. The pillow that is located within a typical prior art pet bed is also not convenient to wash. As a consequence, pet beds are not cleaned as effectively and frequently as they should be, and can become a source of unpleasant odors and potential unsanitary conditions.

A need exists for a pet bed covering which is more readily removable for washing purposes, with an integrated pillow. The present invention satisfies this need, and provides other, related, advantages.

SUMMARY OF THE INVENTION

In accordance with an embodiment of the present invention, a pet bed covering apparatus is disclosed. The apparatus comprises, in combination: a pillow region adapted to at least substantially cover a bottom portion of a pet bed; a pillow removably received within the pillow region; and a side region extending around a circumference of the pillow region and adapted to at least substantially cover interior sides of the pet bed.

In accordance with another embodiment of the present invention, a pet bed covering apparatus is disclosed. The apparatus comprises, in combination: a pet bed; a pillow region adapted to at least substantially cover a bottom portion of the pet bed; a pillow removably received within the pillow region; and a side region extending around a circumference of the pillow region and adapted to at least substantially cover interior sides of the pet bed.

In accordance with a further embodiment of the present invention, a pet bed covering apparatus is disclosed. The apparatus comprises, in combination: a pillow region adapted to at least substantially cover a bottom portion of a pet bed; a pillow removably received within the pillow region; a side region extending around a circumference of the pillow region and adapted to at least substantially cover interior sides of the pet bed; an elastic region positioned around a perimeter of the side region; wherein the side region covers interior and exterior sides of the pet bed; and a zipper enclosure, through which the pillow may be alternately removed and inserted.

DETAILED DESCRIPTION OF THE PREFERRED EMBODIMENTS

Referring first to FIGS. 1-6, a pet bed covering apparatus 10 ("apparatus 10") consistent with an embodiment of the present invention is shown. In this embodiment, the apparatus 10 comprises a pillow region 12 and a side region 14.

Figure 1:
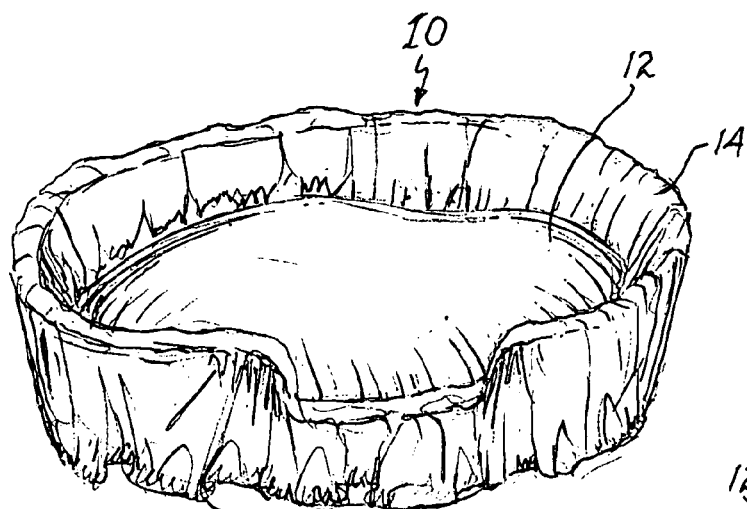
FIG. 1 is a perspective view of a pet bed covering consistent with an embodiment of the present invention, in position on a pet bed.
Figure 3:
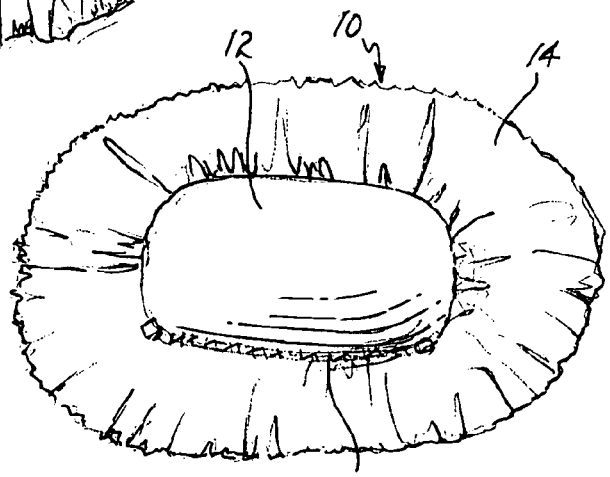
FIG. 3 is a top view of the covering of FIG. 1.
Figure 2:
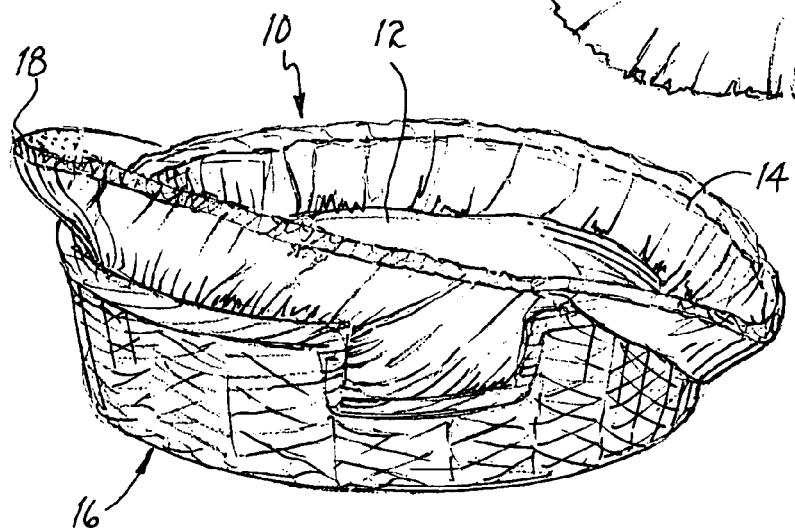
FIG. 2 is a perspective view of the pet bed covering of FIG. 1, illustrating removal and/or positioning of the covering on a pet bed.

As best shown in FIG. 2, the apparatus 10 is adapted to be fitted over a pet bed 16, which may be a wicker-type bed. When the apparatus 10 is in position over a pet bed 16, the pillow region 12 at least substantially covers a bottom portion of the pet bed 16, in the area where a pet (not shown) would lay. The side region 14 at least substantially covers the interior sides of the pet bed 16 and, in this embodiment, may be additionally fitted over the exterior sides of the pet bed 16 for a more secure fit. In one embodiment, the perimeter of the apparatus 10 has an elastic 18 or like material or means fitted therearound, to increase the security of the fit of the apparatus 10 over the pet bed 16.

Figure 4:
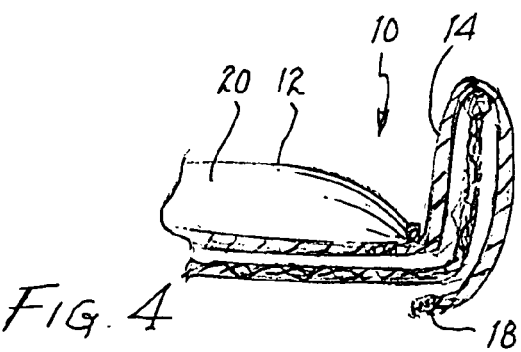
FIG. 4 is a side, cross-sectional view of the covering of FIG. 1.
Figure 5:
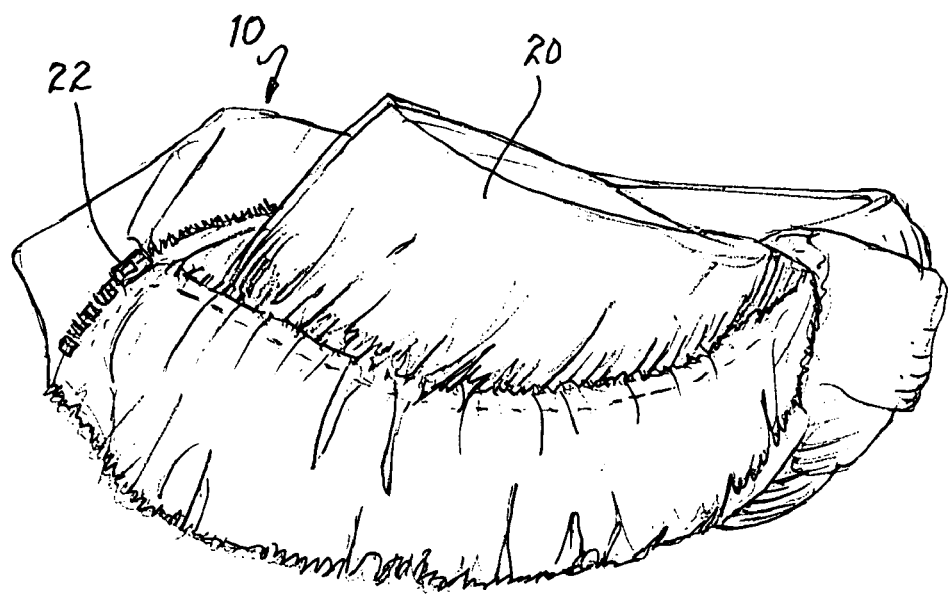
FIG. 5 is a perspective view of the covering of FIG. 1, illustrating removal of the pillow contained therein.
Figure 6:
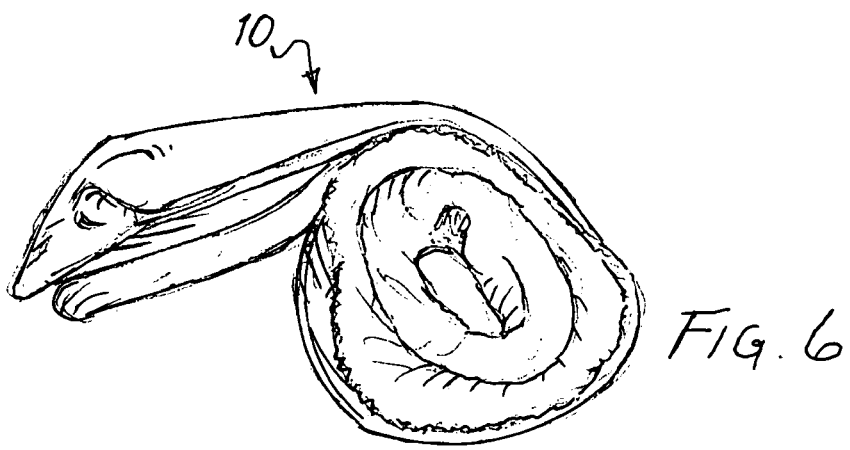
FIG. 6 is a side view of the covering of FIG. 1, illustrating a manner in which the covering may be rolled-up for storage purposes.

Referring now to FIGS. 4-5, the apparatus 10 has contained within the pillow region 12 a removable pillow 20. Removability of the pillow 20 is achieved by the use of means, such as a zipper 22 (see also FIG. 3) or hook and loop material (not shown), that allows the pillow 20 to be encased within the pillow region 12 or removed therefrom as desired.

When the apparatus 10 is not in use, it may be desired to remove the pillow 20 therefrom. In this configuration, the apparatus 10 may be readily rolled or folded for storage, as shown by way of example in FIG. 6. It may also be desired to remove the pillow 20 for purposes of washing the apparatus 10, with the pillow 20 being re-inserted into the pillow region 12 after washing.

Figure 7:
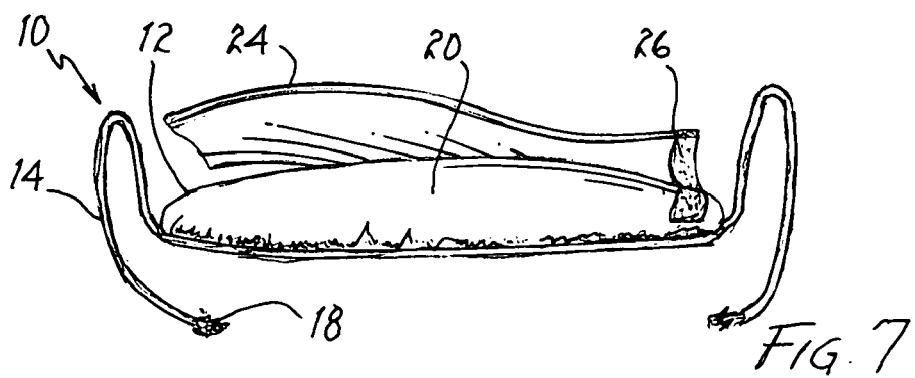
FIG. 7 is a side view of a pet bed covering consistent with another embodiment of the present invention, having a removal blanket coupled thereto.

Referring now to FIG. 7, in this embodiment, a removable blanket 24 is provided. As shown herein, the blanket 24 is removably coupled at least one end thereof with corresponding regions of hook and loop material 26. This permits a blanket 24 to be positioned in a relatively secure manner over a sleeping pet, while also allowing the blanket 24 to be removed when not needed and/or for washing or storage purposes.

While the invention has been particularly shown and described with reference to the preferred embodiments thereof, it will be understood by those skilled in the art that the foregoing and other changes in form and details may be made therein without departing from the spirit and scope of the invention.

I claim:

1. A pet bed covering apparatus comprising, in combination:
   a pet bed;
   a pillow region adapted to at least substantially cover a bottom portion of a pet bed;
   a pillow removably received within the pillow region;
   a side region extending around a circumference of the pillow region and adapted to at least substantially cover interior sides of the pet bed;

an elastic region positioned around a perimeter of the side region;

wherein the side region covers interior and exterior sides of the pet bed;

a zipper enclosure, through which the pillow may be alternately removed and inserted;

a removable blanket coupled to the pillow region; and one of hook and loop material positioned on the blanket and the other of hook and loop material positioned on the pillow region.

* * * * *